(12) United States Patent
Govindarajan et al.

(10) Patent No.: US 7,684,400 B2
(45) Date of Patent: Mar. 23, 2010

(54) LOGARITHMIC TIME RANGE-BASED MULTIFIELD-CORRELATION PACKET CLASSIFICATION

(75) Inventors: Priya Govindarajan, Hillsboro, OR (US); Chun Yang Chiu, Beaverton, OR (US); David M. Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1577 days.

(21) Appl. No.: 10/216,051

(22) Filed: Aug. 8, 2002

(65) Prior Publication Data

US 2004/0028046 A1    Feb. 12, 2004

(51) Int. Cl.
*H04L 12/56* (2006.01)
*H04J 3/16* (2006.01)
*H04L 12/28* (2006.01)

(52) U.S. Cl. ................ 370/392; 370/471; 370/408
(58) Field of Classification Search .......... 370/89, 370/392
See application file for complete search history.

(56) References Cited

U.S. PATENT DOCUMENTS

| | | | | |
|---|---|---|---|---|
| 5,956,721 A | * | 9/1999 | Douceur et al. | 707/10 |
| 6,041,053 A | * | 3/2000 | Douceur et al. | 370/389 |
| 6,157,955 A | * | 12/2000 | Narad et al. | 709/228 |
| 6,289,013 B1 | | 9/2001 | Lakshman et al. | |
| 6,341,130 B1 | * | 1/2002 | Lakshman et al. | 370/389 |
| 6,522,632 B1 | * | 2/2003 | Waters et al. | 370/254 |
| 6,587,463 B1 | * | 7/2003 | Hebb et al. | 370/392 |
| 6,594,268 B1 | * | 7/2003 | Aukia et al. | 370/400 |
| 6,691,168 B1 | * | 2/2004 | Bal et al. | 709/238 |
| 6,778,984 B1 | | 8/2004 | Lu et al. | |
| 6,798,788 B1 | * | 9/2004 | Viswanath et al. | 370/469 |
| 7,317,723 B1 | * | 1/2008 | Guru | 370/392 |
| 7,382,777 B2 | * | 6/2008 | Irish et al. | 370/392 |
| 7,554,980 B1 | * | 6/2009 | Yeh et al. | 370/392 |
| 2002/0023080 A1 | * | 2/2002 | Uga et al. | 707/1 |
| 2002/0023089 A1 | * | 2/2002 | Woo | 707/101 |
| 2002/0095421 A1 | * | 7/2002 | Koskas | 707/100 |
| 2002/0152209 A1 | * | 10/2002 | Merugu et al. | 707/7 |
| 2002/0159466 A1 | * | 10/2002 | Rhoades | 370/408 |
| 2002/0181480 A1 | * | 12/2002 | Puleston | 370/408 |
| 2003/0120622 A1 | * | 6/2003 | Nurmela et al. | 706/47 |
| 2003/0231630 A1 | * | 12/2003 | Messenger | 370/392 |

(Continued)

FOREIGN PATENT DOCUMENTS

DE    100 58 443    10/2001

(Continued)

OTHER PUBLICATIONS

Red-Black Tree Operation, [On-Line] retrieved from Internet on Feb. 19, 2002 at URL http://swww.ee.uwa.edu.au/-plsd210/ds/red_black_op.html.

(Continued)

*Primary Examiner*—Chi H Pham
*Assistant Examiner*—Warner Wong
(74) *Attorney, Agent, or Firm*—Fish & Richardson P.C.

(57) ABSTRACT

Classification of network data packets includes a determination sets of one or more filter-identifiers where each set is associated with a respective data-packet classifier field. A result-set of filter-identifiers may be derived based on an intersection of the filter-identifier sets.

26 Claims, 11 Drawing Sheets

| POLICY | DESTINATION PORT | SOURCE PORT | SOURCE ADDRESS | BIT REPRESENTATION | FILTER ID |
|---|---|---|---|---|---|
| P1 | 1000-2000 | 4000 | 8300 | 1 0 0 0 0 0 0 1 | 129 |
| P2 | 1000-2000 | 4100 | 8100 | 1 0 0 0 0 0 1 0 | 130 |
| P3 | 1000-2000 | 4200 | 8200 | 1 0 0 0 0 0 1 1 | 131 |
| P4 | 1000-2000 | 4300 | 8300 | 1 0 0 0 0 1 0 0 | 132 |
| P5 | 1000-2000 | 4400 | 8400 | 1 0 0 0 0 1 0 1 | 133 |
| P6 | 1000-2000 | 4500 | 8300 | 1 0 0 0 0 1 1 0 | 134 |
| P7 | 1100 | 4000-5000 | 8100 | 0 1 0 0 0 1 1 1 | 71 |
| P8 | 1200 | 4000-5000 | 8300 | 0 1 0 0 1 0 0 0 | 72 |
| P9 | 1300 | 4000-5000 | 8300 | 0 1 0 0 1 0 0 1 | 73 |
| P10 | 1400 | 4000-5000 | 8400 | 0 1 0 0 1 0 1 0 | 74 |
| P11 | 1500 | 4000-5000 | 8300 | 0 1 0 0 1 0 1 1 | 75 |
| P12 | 2000 | 4000-5000 | 9500 | 0 1 0 0 1 1 0 0 | 76 |

U.S. PATENT DOCUMENTS

2004/0008634 A1*    1/2004    Rangarajan et al. ......... 370/256
2004/0022243 A1*    2/2004    Jason, Jr. .................... 370/389
2004/0258061 A1*   12/2004    Sahni et al. ................. 370/389

FOREIGN PATENT DOCUMENTS

| EP | 1 128 609 | 8/2001 |
|----|-----------|--------|
| EP | 1 180 882 | 2/2002 |
| EP | 1 227 630 | 7/2002 |
| WO | WO 99/59303 | 11/1999 |
| WO | WO 01/59702 | 8/2001 |
| WO | WO 01/71982 | 9/2001 |
| WO | WO 02/15469 | 2/2002 |
| WO | WO 02/15488 | 2/2002 |
| WO | WO 02/15521 | 2/2002 |

OTHER PUBLICATIONS

Red-Black Tree, [On-Line] retrived from Internet on Feb. 19, 2002 at URL http://swww.ee.uwa.edu.au//-plsd210/ds/red_black.html.

Meeting traffic demands with next-generation Internet infrastracture, [On-Line] retrieved from Internet on Apr. 9, 2003 at URL: http://www.siliconacesss.com/news/Lightwave_may_01.html.

CS 660: Combinatorial Algorithms Red-Black and B trees, website retrieved from [On-Line] on Feb. 19, 2002 at URL: http://www.eli.sdsu.edu/courses/fall95/cs660/notes/RedBlackTree/RedBlack.html.

* cited by examiner

| Policy | Source Address | Destination Address | Source Port |
|---|---|---|---|
| P1 | 1.2.3.4-10.10.10.10 | 11.12.13.10 | 1000 |
| P2 | 7.8.9.10 | 101.101.100.100 | 1000-2000 |
| P3 | 1.2.3.4-10.10.10.10 | 11.12.13.10-11.12.13.50 | 3000 |
| P4 | 101.101.100.100 | 101.101.100.200 | 2000-3000 |
| P5 | 5.6.7.8-101.101.100.200 | 10.10.10.10-10.10.10.50 | 1000-5000 |

| POLICY | DESTINATION PORT | SOURCE PORT | SOURCE ADDRESS | BIT REPRESENTATION | FILTER ID |
|---|---|---|---|---|---|
| P1 | 1000-2000 | 4000 | 8300 | 1 0 0 0 0 0 0 1 | 129 |
| P2 | 1000-2000 | 4100 | 8100 | 1 0 0 0 0 0 1 0 | 130 |
| P3 | 1000-2000 | 4200 | 8200 | 1 0 0 0 0 0 1 1 | 131 |
| P4 | 1000-2000 | 4300 | 8300 | 1 0 0 0 0 1 0 0 | 132 |
| P5 | 1000-2000 | 4400 | 8400 | 1 0 0 0 0 1 0 1 | 133 |
| P6 | 1000-2000 | 4500 | 8300 | 1 0 0 0 0 1 1 0 | 134 |
| P7 | 1100 | 4000-5000 | 8100 | 0 1 0 0 0 1 1 1 | 71 |
| P8 | 1200 | 4000-5000 | 8300 | 0 1 0 0 1 0 0 0 | 72 |
| P9 | 1300 | 4000-5000 | 8300 | 0 1 0 0 1 0 0 1 | 73 |
| P10 | 1400 | 4000-5000 | 8400 | 0 1 0 0 1 0 1 0 | 74 |
| P11 | 1500 | 4000-5000 | 8300 | 0 1 0 0 1 0 1 1 | 75 |
| P12 | 2000 | 4000-5000 | 9500 | 0 1 0 0 1 1 0 0 | 76 |

FIG. 8

| POLICY | DESTINATION PORT | SOURCE PORT | SOURCE ADDRESS | BIT REPRESENTATION | FILTER ID |
|---|---|---|---|---|---|
| P7 | 1100 | 4000-5000 | 8100 | 0 1 0 0 0 1 1 1 | 71 |
| P8 | 1200 | 4000-5000 | 8300 | 0 1 0 0 1 0 0 0 | 72 |
| P9 | 1300 | 4000-5000 | 8300 | 0 1 0 0 1 0 0 1 | 73 |
| P10 | 1400 | 4000-5000 | 8400 | 0 1 0 0 1 0 1 0 | 74 |
| P11 | 1500 | 4000-5000 | 8300 | 0 1 0 0 1 0 1 1 | 75 |
| P12 | 2000 | 4000-5000 | 9500 | 0 1 0 0 1 1 0 0 | 76 |
| P1 | 1000-2000 | 4000 | 8300 | 1 0 0 0 0 0 0 1 | 129 |
| P2 | 1000-2000 | 4100 | 8100 | 1 0 0 0 0 0 1 0 | 130 |
| P3 | 1000-2000 | 4200 | 8200 | 1 0 0 0 0 0 1 1 | 131 |
| P4 | 1000-2000 | 4300 | 8300 | 1 0 0 0 0 1 0 0 | 132 |
| P5 | 1000-2000 | 4400 | 8400 | 1 0 0 0 0 1 0 1 | 133 |
| P6 | 1000-2000 | 4500 | 8300 | 1 0 0 0 0 1 1 0 | 134 |

FIG. 9

| POLICY | DESTINATION PORT | SOURCE PORT | SOURCE ADDRESS | FILTER ID |
|---|---|---|---|---|
| P1 | 1000-2000 | 4000 | 8300 | (4000, 1000, 8300) |
| P2 | 1000-2000 | 4100 | 8100 | (4100, 1000, 8100) |
| P3 | 1000-2000 | 4200 | 8200 | (4200, 1000, 8200) |
| P4 | 1000-2000 | 4300 | 8300 | (4300, 1000, 8300) |
| P5 | 1000-2000 | 4400 | 8400 | (4400, 1000, 8400) |
| P6 | 1000-2000 | 4500 | 8300 | (4500, 1000, 8300) |
| P7 | 1100 | 4000-5000 | 8100 | (4000, 1100, 8100) |
| P8 | 1200 | 4000-5000 | 8300 | (4000, 1200, 8300) |
| P9 | 1300 | 4000-5000 | 8300 | (4000, 1300, 8300) |
| P10 | 1400 | 4000-5000 | 8400 | (4000, 1400, 8400) |
| P11 | 1500 | 4000-5000 | 8300 | (4000, 1500, 8300) |
| P12 | 2000 | 4000-5000 | 9500 | (4000, 2000, 9500) |

FIG. 10

| POLICY | DESTINATION PORT | SOURCE PORT | SOURCE ADDRESS | FILTER ID |
|---|---|---|---|---|
| P1 | 1000-2000 | 4000 | 8300 | (4000, 1000, 8300) |
| P7 | 1100 | 4000-5000 | 8100 | (4000, 1100, 8100) |
| P8 | 1200 | 4000-5000 | 8300 | (4000, 1200, 8300) |
| P9 | 1300 | 4000-5000 | 8300 | (4000, 1300, 8300) |
| P10 | 1400 | 4000-5000 | 8400 | (4000, 1400, 8400) |
| P11 | 1500 | 4000-5000 | 8300 | (4000, 1500, 8300) |
| P12 | 2000 | 4000-5000 | 9500 | (4000, 2000, 9500) |
| P2 | 1000-2000 | 4100 | 8100 | (4100, 1000, 8100) |
| P3 | 1000-2000 | 4200 | 8200 | (4200, 1000, 8200) |
| P4 | 1000-2000 | 4300 | 8300 | (4300, 1000, 8300) |
| P5 | 1000-2000 | 4400 | 8400 | (4400, 1000, 8400) |
| P6 | 1000-2000 | 4500 | 8300 | (4500, 1000, 8300) |

LOGARITHMIC TIME RANGE-BASED MULTIFIELD-CORRELATION PACKET CLASSIFICATION

TECHNICAL FIELD

This disclosure relates to network packet classification by a logarithmic time range-based multifield-correlation packet classifier.

BACKGROUND

Network devices may be used to perform actions on the packets of data flowing through them. The actions performed may vary with the kind of data traffic flowing through the device and on the policies set up at the device. For example, the device can have a policy for marking all traffic from a particular subnet with high priority, send specific flows through a particular MPLS (Multi-protocol Label Switch) tunnel or VPN (Virtual Private Network), or collect per-flow statistics for accounting/billing purposes.

Packet classifiers are used to determine the policy applied by the network device. The policies applied to the packet may be determined, for example, from a search of the fields in the packet header. The packet classifiers (also known as "filters") for the policies may be searched for matches with the packet header field each time a packet arrives at the device.

BRIEF DESCRIPTION OF THE DRAWINGS

FIG. 8 is a table illustrating filter-identifiers.

FIG. 9 illustrates the table of FIG. 8 sorted by filter-ID;

FIG. 10 illustrates the table of FIG. 8 sorted by data-packet classifier field entries.

FIG. 11 illustrates the table of FIG. 10 sorted by filter-ID.

DETAILED DESCRIPTION

Figure 1:
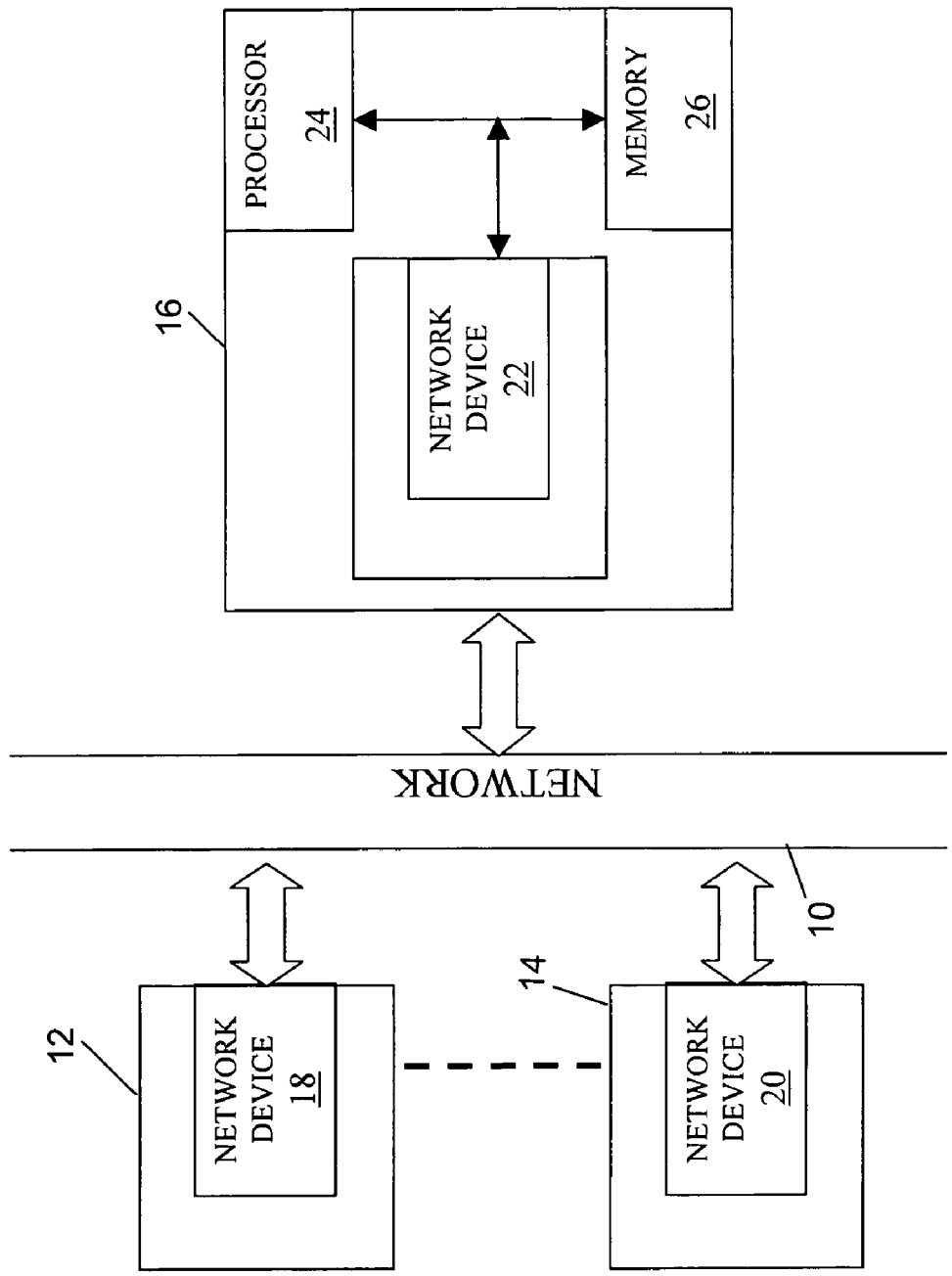
FIG. 1 is an example of a network for transmitting and receiving data packets.

FIG. 1 illustrates a network 10 that may be employed to relay packets of information betweens nodes 12, 14 and 16. Although only three nodes are shown, the network 10 may couple many nodes. Nodes 12, 14 and 16 include network devices 18, 20 and 22, respectively. Node 16 illustrates, by way of example, that a node also may include a processor 24 and memory 26. Network device 22 may be used in conjunction with the processor 24 and memory 26 to provide network services on the packets of information received at node 16. Data packets may be transferred between nodes on the network.

A data-packet received by a node may include a data-packet header field to indicate one or more characteristics of the data. For example, the header may indicate an address from where the data-packet was sent, an address where the data-packet is to be sent, an operation to be performed on all or part of the data, etc.

Network nodes have policies associated with them. Policy-based networking is the management of a network so that various kinds of traffic—data, voice and video, for example—receive the priority of availability and bandwidth needed to serve the network's users effectively.

The policies may be stored in a policy repository such as memory 26. The network device can communicate the data-packet header field entries to a processor 24. Processor 24 operates on the entries to classify the data-packet in terms of the policies that are applicable to the data-packet. The applicable policies may be retrieved by the processor from the policy repository in memory 26.

The policies that are applicable to a particular data-packet may be determined from the entries in the data-packet header fields. A policy may be applicable, in a particular example, to all data-packets originating from a certain source address. Other policies may be range-based. "Range-based" policies are policies that apply to data-packets that have header field entries that fall within a range of values. For example, a policy may apply to all data-packets originating from a source having an address within a range of addresses. The policies, in the particular example, have a source address or range of addresses to filter the data-packets and determine to which packets a policy applies.

Figures 2, 3:
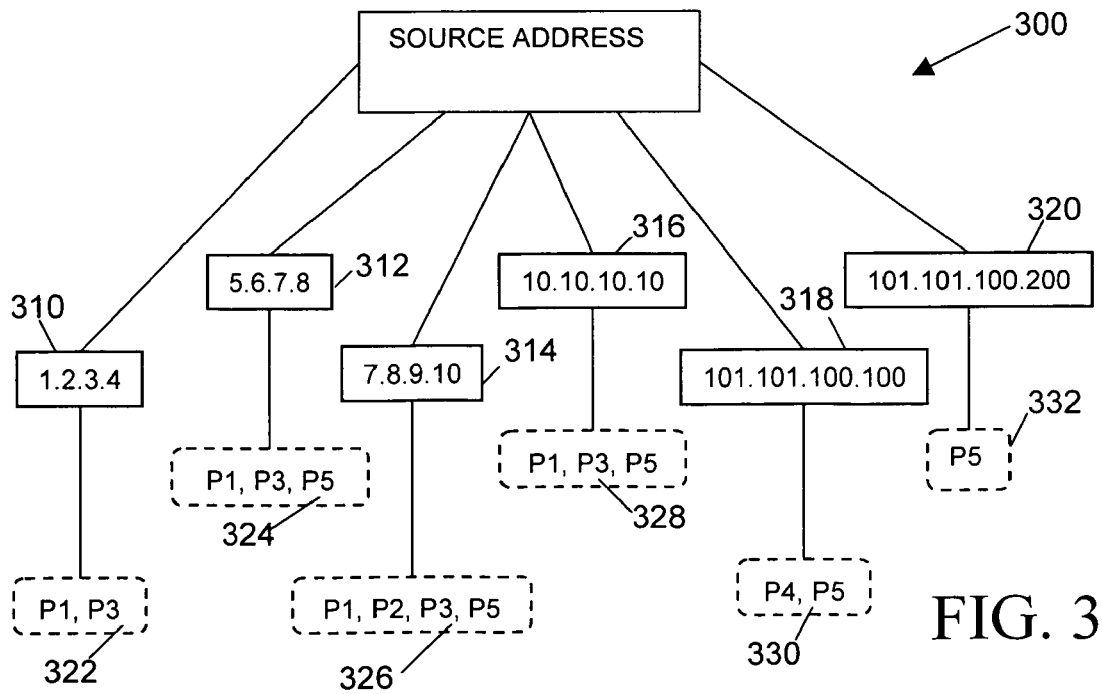
FIG. 2 is an illustrative table of policies and associated data-packet header field filters.
FIG. 3 is a source address filter tree diagram for the table of FIG. 2.
Figure 4:
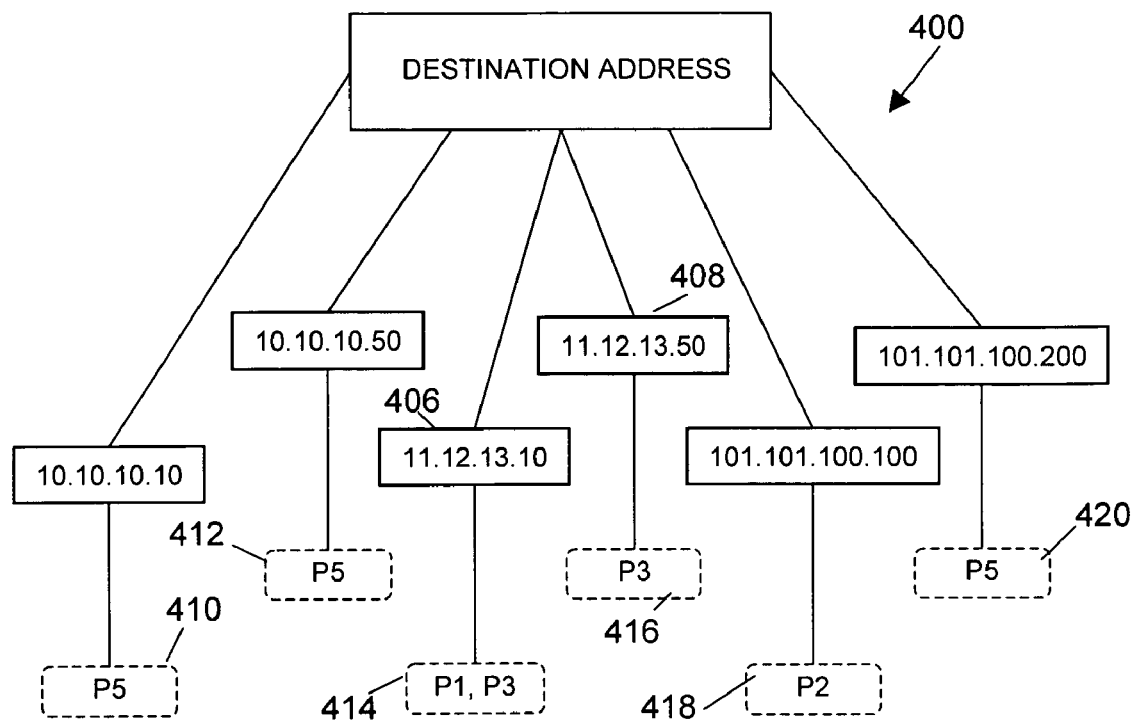
FIG. 4 is a destination address filter tree diagram for the table of FIG. 2.
Figure 5:
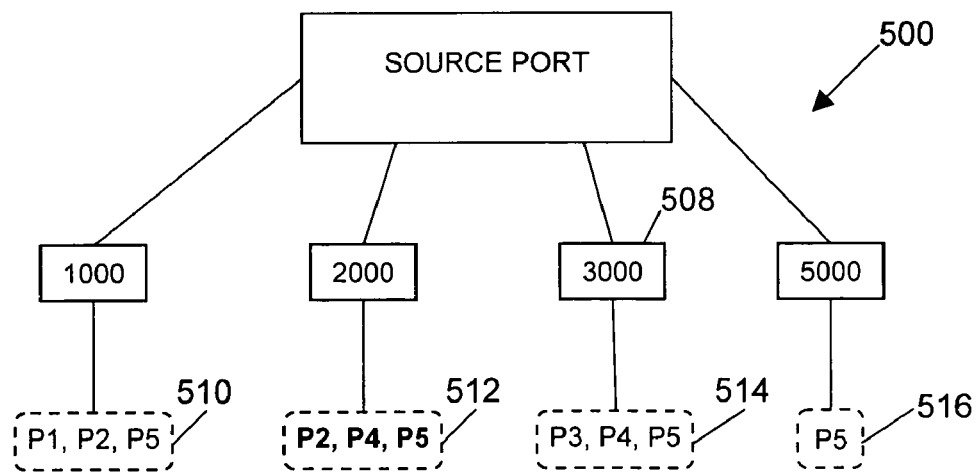
FIG. 5 is a source-port-filter tree diagram for the table of FIG. 2.

One implementation of the packet classification employs a red-black balanced binary tree created for each filter element type corresponding to a particular data-packet header field. FIG. 2 illustrates a particular implementation having a set of policies, policy-ID (policy-identifier) 202, associated with a 3-tuple packet classification of source address 204, destination address 206 and source port 208. FIGS. 3, 4 and 5 illustrate, in tree form, the source address, destination address and source port filters, respectively, of the policies illustrated in FIG. 2. The number of packet header fields employed in the classification is not limited to the specific fields illustrated.

As an example of the tree construction, FIG. 3 illustrates a source-address tree 300 of the source addresses 204 associated with the policy-IDs 202 of FIG. 2. Each of the filter nodes, 310-320, is an address from the source addresses 204 of FIG. 2. Filter nodes 310-320 are arranged in order of their value. In the tree illustrated, the filter nodes are arranged in ascending order of their address value from left to right. However, the filter nodes may be arranged in other hierarchical orders. The policies associated with each of the filter nodes 310-320 are illustrated in reference policy boxes 322-332.

Each of the reference policy boxes 322-332 holds a reference to the list of policies that match the filter node. For example, referring to FIG. 2, a packet-header source address of 7.8.9.10 falls within the range of source addresses that implicate the policies identified by policy-IDs P1, P2, P3 and P5. These policy-IDs are illustrated in FIG. 3 reference policy box 326. The remaining reference policy boxes 322, 324 and 328-332 are similarly determined. The reference policy boxes 410-420 for the destination-address tree 400 of FIG. 4 and the reference policy boxes 510-516 for the source-port tree 500 of FIG. 5 may be determined in an analogous manner.

The policy having the policy-ID of P3 in FIG. 2 is applied to packets that have the following entries in the header fields: (1) a Source Address in the range of addresses from 1.2.3.4 to 10.10.10.10, (2) a Destination Address in the range of addresses from 11.12.13.10 to 11.12.13.50, and (3) a Source Port of 3000.

Figure 6:
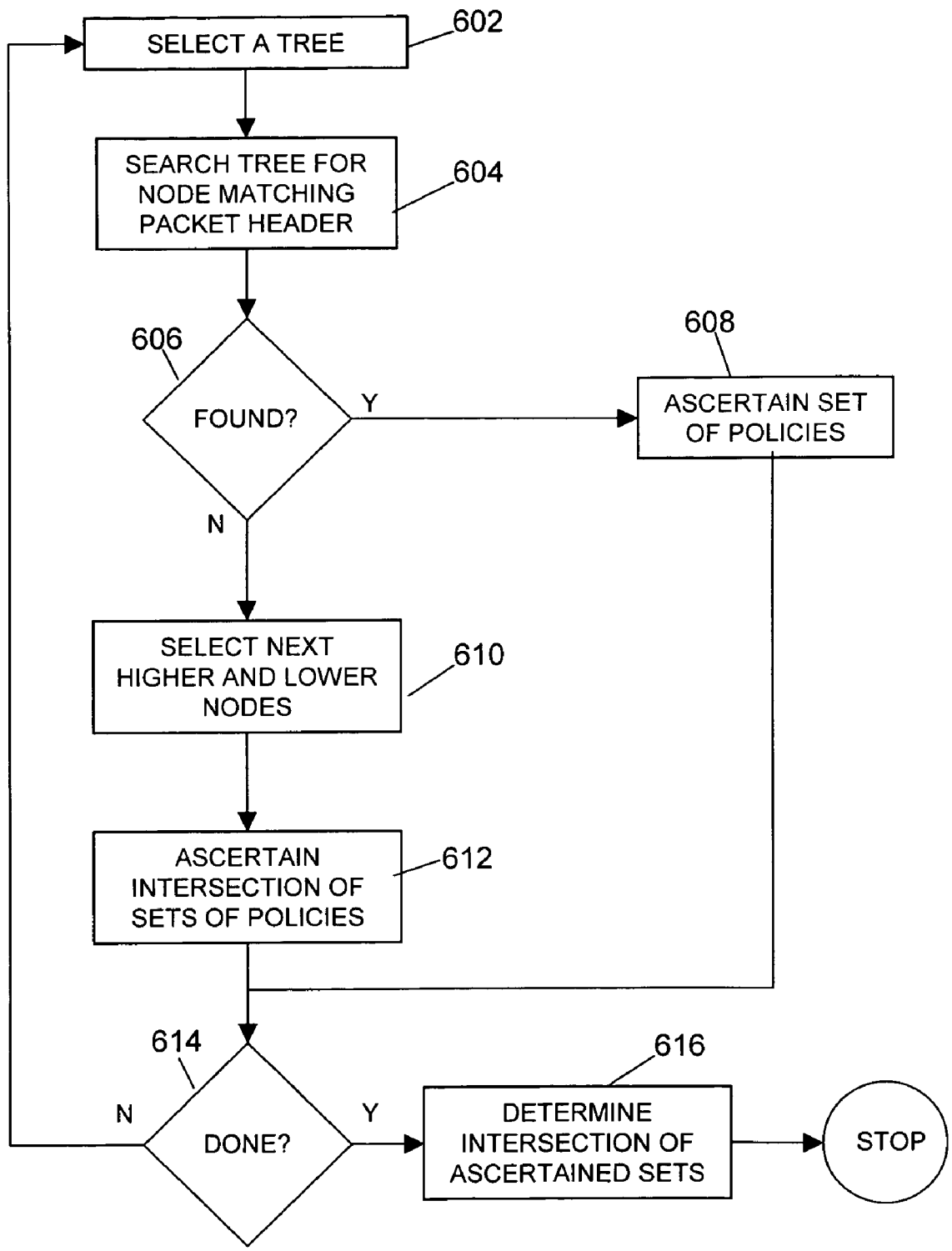
FIG. 6 is a flow chart of a process to determine the policies associated with a packet header field.

FIG. 6 illustrates a process to determine the policies associated with a packet header. The process may be implemented as a program executable by a processor, or using other circuitry. A tree is selected at 602. The selected tree is searched for the value matching the value in the packet header at 604. If a filter node having a value matching the value in the packet header is found at 606, the reference policies associated with the found filter node are ascertained at 608 and the program proceeds to 614.

If a match for the packet header value is not found at 606, both the filter node with a value just less and the filter node with a value just greater than the packet header value are selected at 610. A non-existent node to either higher or lower is considered a null set. The list of matches for this packet header value is the set intersection of the list of policies associated with these filter nodes and is determined at 612.

Blocks 602-612 are repeated until the policy lists from each tree are obtained at 614. A set intersection of all the obtained lists provides the set of policies that match the data packet at 616.

In an illustrative example, the trees of FIGS. 3-5 can be used for determining the set of policies that match a packet having a source address 5.6.7.8, destination address 11.12.13.40 and source port 3000.

Referring to FIG. 3, the source-address tree has a filter node 312 that is a match for the packet-header source address 5.6.7.8. The set of policies obtained is {P1, P3, P5} as illustrated in reference policy box 324.

Referring to FIG. 4, the destination-address tree does not have a filter node that is a match for the packet-header destination address 11.12.13.40. The filter node having a value just below this address is filter node 406 which has the value 11.12.13.10. The set of policies obtained for filter node 406 is {P1, P3} as illustrated in reference policy box 414. The filter node having a value just above the packet-header destination address is filter node 408 which has the value 11.12.13.50. The set of policies obtained for filter node 408 is {P3} as illustrated in reference policy box 416. The intersection of the two obtained policy sets is:

{P1, P3}∩{P3}={P3}

This is the set of policies associated with the destination address 11.12.13.40 of this example.

Referring to FIG. 5, the source-port tree has a filter node 508 that is a match for the packet header source port address 3000. The set of policies obtained is {P3, P4, P5} as illustrated in reference policy box 514.

The set intersection of policies obtained from all of the trees:

{P1, P3, P5}∩{P3}∩{P3, P4, P5}={P3}

The result is {P3} as the policy-ID match for this packet.

Figure 12:
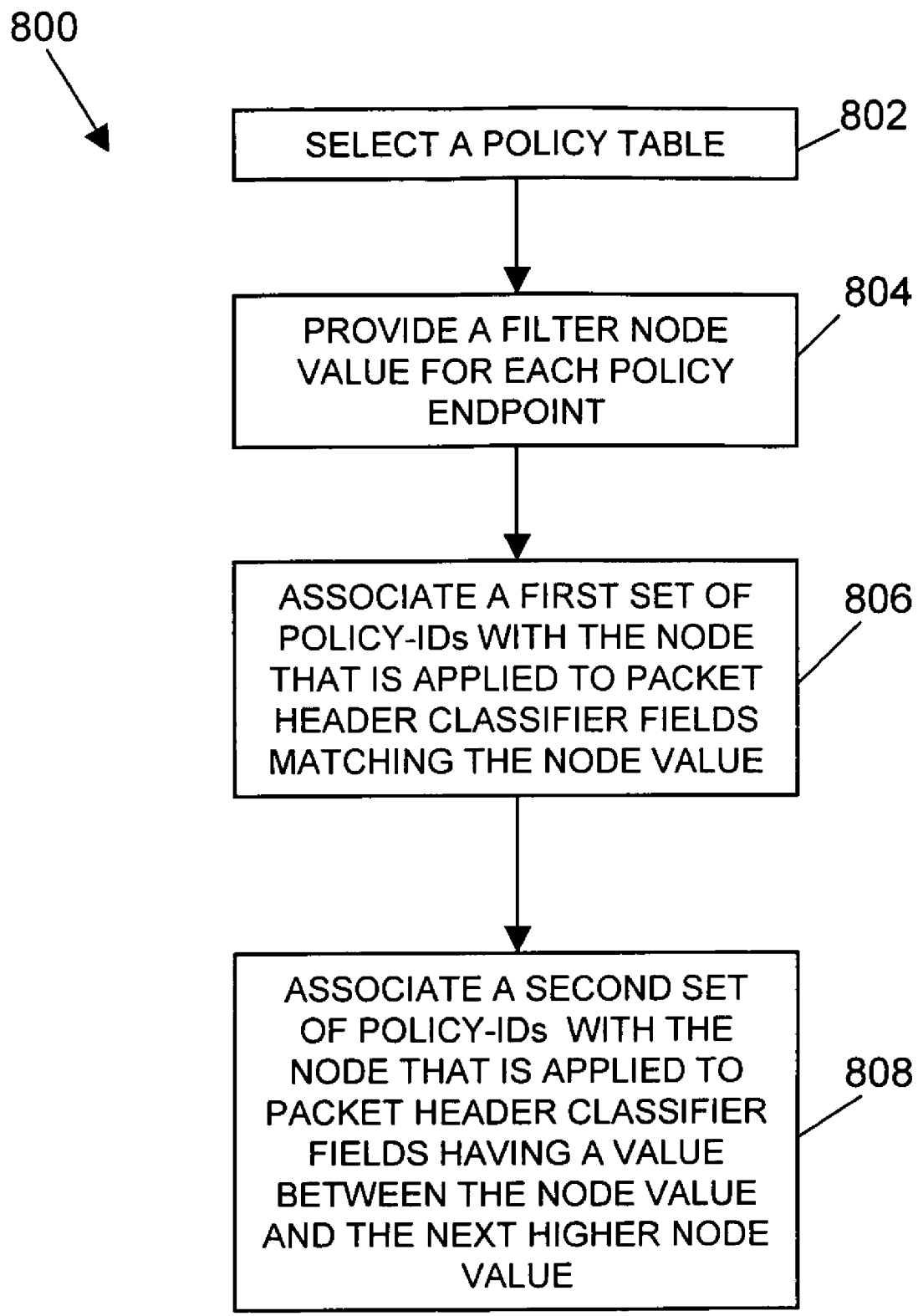
FIG. 12 is a flow chart of a process to associate two policy-ID sets with each node of a filter tree.

In another implementation, FIG. 12 illustrates a process 800 for creating a tree where the intersection sets for the trees may be computed when the policies are installed in the tree rather than at run-time, when the packet arrives. In this implementation, two sets of policy-IDs may be associated with each node value of a tree as described below. A table of policies associated with a packet-header classifier-field is selected at 802. A filter node for each policy endpoint is entered into the tree at 804. A first set of policy-IDs is associated with each node at 806. The first set is a set of policy-IDs from the table that may be applicable to packets having packet-header classifier-field values exactly matching the node value. The first set may be called the exact-match set. A second set of policy-IDs is associated with each node at 808. The second set includes the policy-IDs from the table that may be applied to packets having packet-header classifier-field values between the node value and the next higher node value in the tree. The second set may be called the range-based set. This association of two sets of policy-IDs may be accomplished for each packet-header classifier-field.

Figure 13:
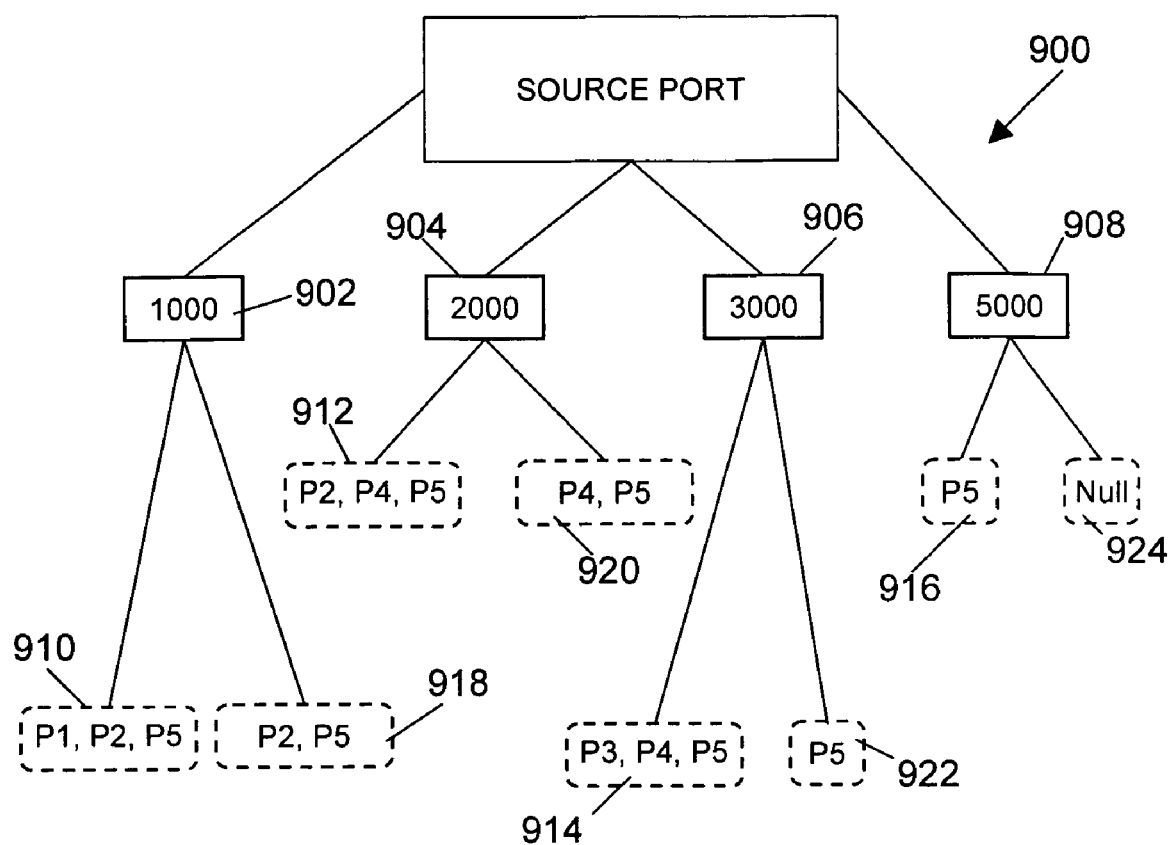
FIG. 13 is a source-port filter tree diagram for the table of FIG. 2 having two policy-ID sets associated with each tree node.

FIG. 13 illustrates a source-port filter node tree 900 of the policy table of FIG. 2 having an exact-match policy-ID set and a range-based policy-ID set associated with each filter node. Each of the filter nodes, 902-908, is an address from the source port of FIG. 2. Filter nodes 902-908 are arranged in order of their value. In the tree illustrated, the filter nodes are arranged in ascending order of their value from left to right. However, the filter nodes may be arranged in other hierarchical orders. The policies associated with each of the filter nodes 902-908 are illustrated in reference policy boxes 910-916.

Each node is associated with two policy-ID sets: an exact-match policy-ID set 910-916 and a range-based policy-ID set 918-924. The exact-match policy-ID set is a set of policies that match the filter node. For example, referring to FIG. 2, a packet-header source port of 1000 falls within the range of source addresses that implicate the policies identified by policy-IDs P1, P2 and P5. These policy-IDs are illustrated in FIG. 13 exact-match set 910. The remaining exact-match sets 912, 914 and 916 are similarly determined.

The exact-match set associated with a node is applied to a packet having a packet-header source port value exactly matching the node value.

The range-based policy-ID set is a set of policies that may be applied to a packet having a packet-header classifier-field value that is not an exact match for a node value. The range-based set is the set intersection between a node and the next higher value node. For example, range-based set 918 is associated with node 902 having the exact-match set 910={P1, P2, P5}. The next higher node is 904 having the exact-match set 912={P2, P4, P5}. The intersection of the two obtained policy sets is:

{P1, P2, P5}∩{P2, P4, P5}={P2, P5}

The set {P2, P5} is the range-based set 918 associated with node 902.

An exact-match set of a non-existing node is defined as the null set. Node 908 has an exact-match set {P5}. Because there is no next higher node after node 908, the next higher node exact-match set is the null set. The intersection set is:

{P5}∩{null}={null}

The null set {null} is the range-based set 924 associated with node 908.

Range-based nodes 920, 922 associated with nodes 904, 906, respectively, may determined in a manner similar to that described above.

Some implementations computing the range-based set before run-time may have an advantage of improving the performance of the search method at run-time because the intersection sets have already been calculated. Another advantage of some implementations is that the intersection set need not be recomputed for successive arrivals of packets having packet-header classifier-fields having values that are not exact matches for a node value in a tree.

As an example, assume that a packet has a packet-header source field of 2000. Referring to FIG. 13, the source port value has an exact-match with the value associated with node 902. The exact-match set of policy-IDs 912 is {P2, P4, P5}. If the source port value is 2500, there is no node in the tree having an exact match for that value. The range-based policy-IDs of the set associated with the node value just below the packet value are applicable to the packet. In this example, node 904 with a value of 2000 is the node just below the packet-header source port value of 2500. The policies relevant to this example packet is the range-based set {P4, P5}.

In a similar manner the policies relevant to other packet-header classifier-fields of the packet may be determined from trees having an exact-match policy-ID set and a range-based policy-ID set associated with each node.

The method associates filter-IDs with policies. The filter-IDs can provide an opportunity to group the policies in a logical manner. The method may identify the policies applicable to a packet by grouping the filter-IDs into non-intersecting sets and ordering the sets for each filter element using another balanced binary tree. Using this method, it is possible to shorten the time to determine the set intersection to approach O(log n) for each filter element type searched. This may result in a searching time approximately [O(log n) lookup per matching filter-ID]*[the number of filter element types searched].

The filter-IDs are logically divided to remove the randomness that could cause O((log n)*n) worst case performance. Logically non-applicable filter-IDs may be skipped using the technique described below in association with FIGS. 8 and 9.

In one implementation, the filter-ID may be preceded by a bit mask descriptor. Each bit in the bit mask represents a particular filter-type element. If the bit is set, then that particular filter-type element represents a range. If the bit is not set, then the filter element is an exact value (not a multi-value range).

Referring to FIG. 2, suppose the filter-ID has eight bits with the highest order three bits representing the bit mask for the three filter elements (source address, destination address and source port, in that order). Then filter-IDs for the policies P1 to P5 may be determined as:

P1: 1 0 0 0 0 0 0 1
P2: 0 0 1 0 0 0 1 0
P3: 1 1 0 0 0 0 1 1
P4: 0 0 1 0 0 1 0 0
P5: 1 1 1 0 0 1 0 1

For policy P1, the illustrated case has the lower 5 bits identifying P1 as 00001. In this case 5 bits were allocated for a policy number although this is not a limitation of the disclosure. The highest order 3 bits are the bit mask. The highest order bit is set to 1 to indicate that the source address filter for P1 is range-based. The next two bits are set to 0 to indicate that the destination address and source port filters are exact values. The combination of the binary bit mask 100 and P1 identifier of 00001 results in a filter-ID of decimal 129. Policies P2-P5 are determined in a similar manner for this example. The table may be sorted by filter-ID, logically grouping the filter-IDs based on the bit mask.

Figure 7:
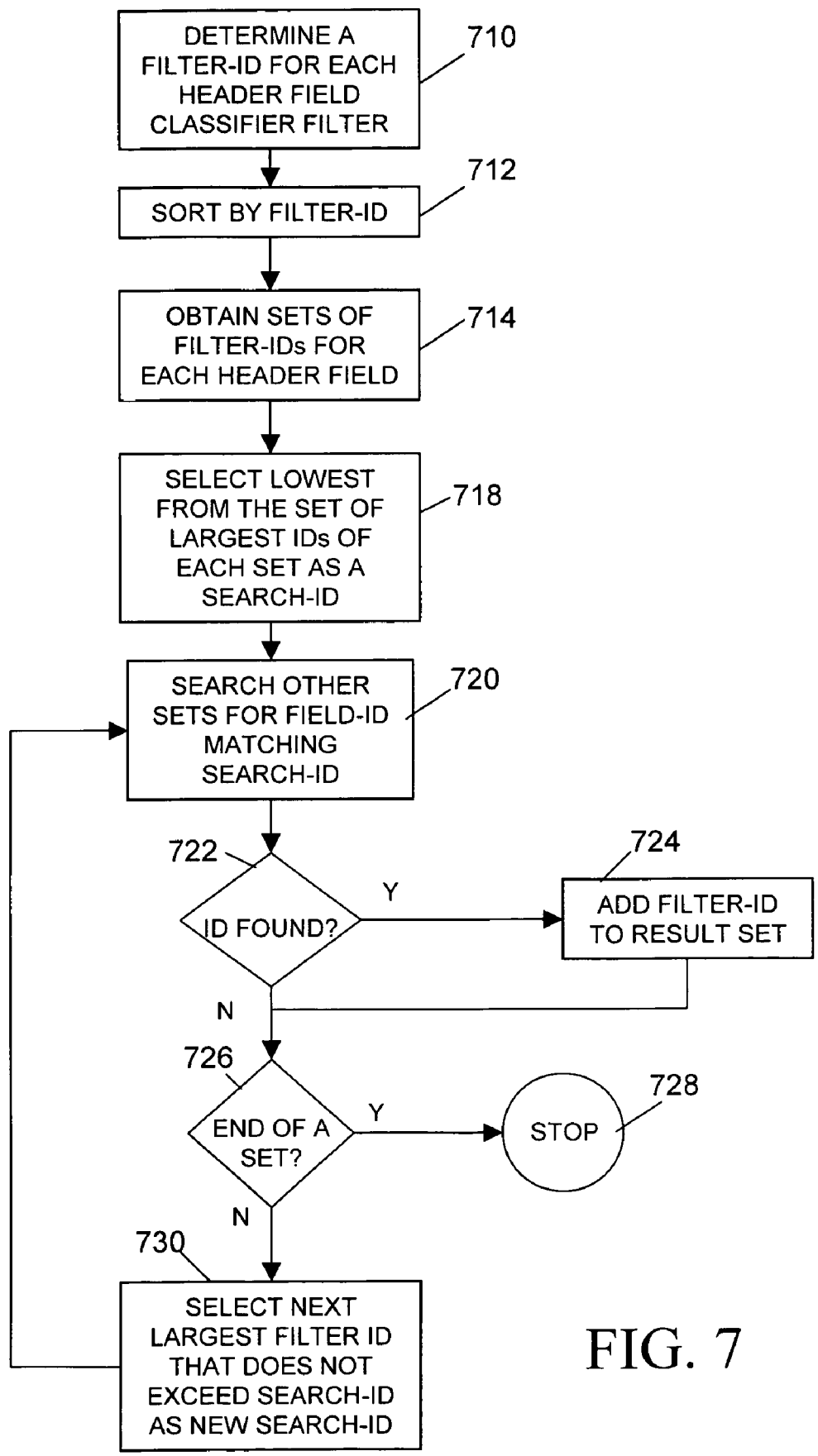
FIG. 7 is a flow chart of a process for determining the data-packet classification.

FIG. 7 illustrates a method of computing the set intersection from the sets obtained for each data-packet header field. At 710, a filter-ID may be associated with each policy-ID in a policy-ID table for each packet header field as described above. The policy tables may then be sorted by filter-ID at 712.

A set of filter-IDs applicable to each data-packet header field may be obtained maintaining the sorted order at 714. At 718 the lowest filter-ID is selected as a search-ID from a set of filter-IDs that is comprised of the largest filter-ID from each data-packet header set. The remaining data-packet sets are searched for a match for the search-ID at 720.

If a match for the search-ID is found at 722 the filter-ID corresponding to the search-ID is added to the result intersection set at 724. A test 722 is performed for a match of the search-ID. If the search-ID is not found at 722, a test 726 is performed to determine if the end of any data-packet set has been reached. If the end of a data-packet set is not determined at 726, the next largest filter-ID is selected that does not exceed the search-ID to be a new search-ID at 730. The processor then loops back to 720 where the other data-packet sets are again searched for a match. Blocks 720-730 are repeated until the end of a data-packet set is determined at 726 and the process stops at 728.

As an illustrative example, FIG. 8 is a policy table having two filter elements, destination port and source port, and twelve policy entries. A bit mask may be prefixed to a policy number as described above to yield a bit representation and resultant filter-ID for each policy in the table. The table may then be sorted by filter-ID to yield the table of FIG. 9.

In another illustrative example, it is assumed that a packet having a source port entry of 4300, destination port entry of 1300 and source address of 8300 arrives at the network device. Referring to FIG. 9, the set of policy-IDs and associated filter-IDs obtained for each packet header field addresses is:

Source Port: {P7, P8, P9, P10, P11, P12, P4}={71, 72, 73, 74, 75, 76, 132}
Destination Port: {P9, P1, P2, P3, P4, P5, P6}={73, 129, 130, 131, 132, 133, 134}
Source Address: {P8, P9, P11, P1, P4, P6}={72, 73, 75, 129, 132, 134}

The set of largest filter-IDs obtained from each set is {source port, destination port, source address}={132, 134, 134}. The lowest of these filter-IDs, 132, is selected as the search-ID.

The remaining sets are searched for a filter-ID that matches the search-ID. In the illustrated example, the destination port and source address sets are searched from the highest towards the lowest filter-ID. The search-ID, 132, is found in all the remaining sets and is added to the result set intersection.

Because the method has not exhausted the filter-IDs in any set, the next largest filter-ID that does not exceed the search-ID is selected from the sets. This filter-ID is used as the new search-ID. In the illustrated example, the filter-IDs that have not been searched in the sets are source port={71, 72, 73, 74, 75, 76}, destination port={73, 129, 130, 131} and source address={72, 73, 75, 129}. The set of largest filter-IDs is {76, 131, 129}. The lowest of these, filter-ID=76, is selected as the new search-ID.

The remaining sets are searched for a filter-ID that matches the new search-ID. The destination port and source address sets of filter-IDs below the previous search-ID are searched towards the lowest filter-ID for a match to the new search-ID. In this example, the search-ID, 76, is not found in all the remaining sets and is not added to the result set intersection.

Because the method still has not exhausted the filter-IDs in any set, the next largest filter-ID that does not exceed the search-ID is selected from the sets. This filter-ID is used as the new search-ID. In the illustrated example, the filter-IDs that have not been searched in the sets are source port={71, 72, 73, 74, 75}, destination port={73} and source address={72, 73}. The set of largest filter-IDs is {75, 73, 73}. The lowest of these, filter-ID=73, is selected as the new search-ID.

The remaining sets are searched for a filter-ID that matches the search-ID. In the illustrated example, the destination port and source port sets are searched from the highest towards the lowest filter-ID. In this example, the search-ID, 73, is found in the all the remaining sets and is added to the result intersection set.

The method has reached the lowest value filter-ID of the source port set and the method is completed. The result set intersection is {P4(132), P9(73)}.

In another implementation, a hierarchical order of the data-packet classifier fields may be used as a filter-ID to order the filters. For example, a filter specifying a source port field entry of 10, destination port field entry of 20 and source address of 30 may have a filter-ID of (10, 20, 30). In this example, the order of significance is, for sorting purposes, source port field entry, destination port field entry and then source address field entry. The filter-ID may also be derived from the packet field entries. As an example, the filter-ID may be one or more of the classifier field values divided by a constant, or operated on in any manner that produces a logical sequencing of the filter-IDs. The sorting characteristics of the filter packet fields are not limited to the number, type, and hierarchical order of the filter-IDs.

FIG. 10 illustrates the filter-IDs derived from the filter table of FIG. 8 using the source port field entry, destination port field entry and source address field entry, as described above, as the filter-ID.

FIG. 11 is the policy table of FIG. 10 sorted by filter-ID, from lowest to highest. The order of policies is determined by comparing the source port field, then the destination port field and then the source address field of the filter ID to determine the hierarchical order of the filter-IDs.

Continuing with the illustrative example, it is assumed that a packet having a source port entry of 4300, destination port entry of 1300 and source address entry of 8300 arrives at the network device. Referring to FIG. 11, the set obtained of policy-IDs and associated filter-IDs for each packet header field addresses is:

Source port: {P7(4000, 1100, 8100), P8 (4000, 1200, 8300), P9(4000, 1300, 8300), P10 (4000, 1400, 8400), P11 (4000, 1500, 8300), P12 (4000, 2000, 9500), P4 (4300, 1000, 8300)}

Destination port: {{P1(4000, 1000, 8300), P9(4000, 1300, 8300), P2(4100, 1000, 8100), P3(4200, 1000, 8200), P4(4300, 1000, 8300), P5(4400, 1000, 8400), P6(4500, 1000, 8300)}

Source address: {{P1(4000, 1000, 8300), P8(4000, 1200, 8300), P9(4000, 1300, 8300), P11(4000, 1500, 8300), P4(4300, 1000, 8300), P6(4500, 1000, 8300)}

The set of largest filter-IDs from each set obtained is {P4 (4300, 1000, 8300), P6(4500, 1000, 8300), P6(4500, 1000, 8300)}. The lowest of these filter-IDs, P4(4300, 1000, 8300), is selected as the search-ID.

The remaining sets are searched for a filter-ID that matches the search-ID. In the illustrated example, the destination port and the source address sets are searched from the highest towards the lowest filter-ID. The search-ID, (4300, 1000, 8300), is found in all the remaining sets and is added to the result intersection set.

Because the method has not yet exhausted the filter-IDs in any set, the next largest filter-ID that does not exceed the search-ID is selected from the sets. This filter-ID is used as the new search-ID. In the illustrated example, the filter-IDs that have not been searched in the sets are:

Source port={P7(4000, 1100, 8100), P8(4000, 1200, 8300), P9(4000, 1300, 8300), P10(4000, 1400, 8400), P11 (4000, 1500, 8300), P12 (4000, 2000, 9500)}

Destination port: {{P1(4000, 1000, 8300), P9(4000, 1300, 8300), P2(4100, 1000, 8100), P3(4200, 1000, 8200)}

Source address: {{P1(4000, 1000, 8300), P8(4000, 1200, 8300), P9(4000, 1300, 8300), P11(4000, 1500, 8300)}

The set of largest filter-IDs is {P12(4000, 2000, 9500), P3(4200, 1000, 8200), P11(4000, 1500, 8300)}. The lowest of these, filter-ID=P11(4000, 1500, 8300), is selected as the new search-ID.

The remaining sets are searched for a filter-ID that matches the new search-ID. The source port set of filter-IDs below the previous search-ID is searched towards the lowest filter-ID for a match to the new search-ID. In this case, the search-ID, P11(4000, 1500, 8300), is not found in all the remaining sets and is not added to the result intersection set.

Because the method has not yet exhausted the filter-IDs in any set, the next largest filter-ID that does not exceed the search-ID is selected from the sets. This filter-ID is used as the new search-ID. In the illustrated example, the filter-IDs that have not been searched in the sets are:

Source port={P7(4000, 1100, 8100), P8(4000, 1200, 8300), P9(4000, 1300, 8300), P10(4000,1400, 8400)}

Destination port: {{P1(4000, 1000, 8300), P9(4000, 1300, 8300)}

Source address: {{P1(4000, 1000, 8300), P8(4000, 1200, 8300), P9(4000, 1300, 8300)}

The set of largest filter-IDs is {P10(4000,1400, 8400), P9(4000, 1300, 8300), P9(4000, 1300, 8300)}. The lowest of these, filter-ID=P9(4000, 1300, 8300), is selected as the new search-ID.

The remaining sets are searched for a filter-ID that matches the search-ID. In the illustrated example, the destination port and the source address sets are searched from the highest towards the lowest filter-ID. The search-ID, P9(4000, 1300, 8300), is found in all the remaining sets and is added to the result intersection set.

Because the method has not yet exhausted the filter-IDs in any set, the next largest filter-ID that does not exceed the search-ID is selected from the sets. This filter-ID is used as the new search-ID. In the illustrated example, the filter-IDs that have not been searched in the sets are:

Source port={P7(4000, 1100, 8100), P8(4000, 1200, 8300)}

Destination port: {{P1(4000, 1000, 8300)}

Source address: {{P1(4000, 1000, 8300), P8(4000, 1200, 8300)}

The set of largest filter-IDs is {P8(4000, 1200, 8300), {P1(4000, 1000, 8300), P8(4000, 1200, 8300)}. The lowest of these, filter-ID=P1(4000, 1000, 8300), is selected as the new search-ID.

The remaining sets are searched for a filter-ID that matches the new search-ID. The source port set of filter-IDs below the previous search-ID is searched towards the lowest filter-ID for a match to the new search-ID. The search-ID, P1(4000, 1000, 8300), is not found in all the remaining sets and is not added to the result intersection set.

The method in the foregoing example has reached the lowest value filter-ID of the source port set, and the method is completed. The result intersection set is {P4(4300, 1000, 8300), P9(4000, 1300, 8300)}.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system.

Furthermore, each such computer program can be stored on a storage medium, such as read-only-memory (ROM), readable by a general or special purpose programmable computer, for configuring and operating the computer when the storage medium is read by the computer to perform the functions described above.

Other implementations are within the scope of the following claims.

What is claimed is:

1. A method comprising:
generating a filter-identifier based, at least in part, on one or more filter elements associated with a data packet header field, wherein the filter-identifier is different from a policy-identifier that identifies a policy applicable to data packets having specified entries in the one or more filter elements;
characterizing the specified entries in the filter elements as either a range-based value or an exact value;
generating a bit mask from the characterizing, each bit in the bit mask corresponding to a filter element;
setting a bit in the bit mask to be a first logical value when its corresponding filter element has a range-based value;
setting a bit in the bit mask to be a second, different logical value when its corresponding filter element has an exact value;
determining respective sets of one or more filter-identifiers, each set associated with a respective filter element; and
producing a result-set of filter-identifiers based on an intersection of the filter-identifier sets.

2. The method of claim 1 further comprising: associating each filter-identifier with a policy-identifier.

3. The method of claim 1 wherein producing the result-set comprises: selecting a particular filter-identifier from one of the filter element sets as a search-identifier; searching the other filter element sets for a match of the search-identifier; and adding the search-identifier to a result set if the search-identifier is found in all of the other sets.

4. The method of claim 3 further comprising iteratively repeating the selecting, searching and adding with respect to at least one subsequent filter-identifier until a last filter-identifier in any set is reached.

5. The method of claim 4 further comprising: placing the filter-identifiers in a hierarchical order; and performing said searching from a filter-identifier with a highest value towards a filter-identifier with a lowest value in the hierarchy.

6. The method of claim 5 wherein selecting a particular filter-identifier comprises: selecting an initial filter-identifier from each filter element set, said initial filter-identifier having a highest value among the filter-identifiers in that filter element set; and selecting one of the initial filter-identifiers as the particular filter-identifier, said one of the initial filter-identifiers having a lowest value among the initial filter-identifiers.

7. The method of claim 6 wherein iteratively selecting a subsequent filter-identifier comprises: selecting a filter-identifier from each filter element set, said filter-identifier having a highest value among the filter-identifiers in that filter element set that is lower in value than the search-identifier value; and selecting one of the filter-identifiers as the iterative particular filter-identifier, said one of the iterative filter-identifiers having a lowest value among the iterative filter-identifiers.

8. A method comprising:
generating node values in a tree for each endpoint value associated with at least one policy-identifier;
associating a first set of policy-identifiers with a particular one of the node values, wherein the first set of policy-identifiers is applied to data-packets having packet-header classifier fields matching the particular one of the node values; and
associating a second set of policy-identifiers with the particular node value, wherein the second set of policy-identifiers is applied to data-packets having packet-header classifier fields with a value between the particular one of the node values and a next higher node value.

9. The method of claim 8 further comprising deriving the second set of policy-identifiers from an intersection set of the first set of policy-identifiers and a first set of policy-identifiers associated with the next higher node value.

10. An article of manufacture comprising a non-transitory machine-readable medium storing machine-executable instructions that when applied to a machine cause the machine to:
generate a filter-identifier based, at least in part, on one or more filter elements associated with a data packet header field, wherein the filter-identifier is different from a policy-identifier that identifies a policy applicable to data packets having specified entries in the one or more filter elements;
characterize the specified entries in the filter elements as either a range-based value or an exact value;
generate a bit mask from the characterizing, each bit in the bit mask corresponding to a filter element;
set a bit in the bit mask to be a first logical value when its corresponding filter element has a range-based value;
set a bit in the bit mask to be a second, different logical value when its corresponding filter element has an exact value;
determine respective sets of one or more filter-identifiers associated with respective filter elements; and
produce a result-set of filter-identifiers that is based on an intersection of the filter-identifier sets.

11. The article of claim 10 further comprising machine-executable instructions for causing the machine to associate each filter-identifier with a policy-identifier.

12. The article of claim 11 comprising the machine-executable instructions to cause the machine to: select a particular filter-identifier from one of the filter element sets as a search-identifier; search the other filter element sets for a match of the search-identifier; add the search-identifier to a result set if the search-identifier is found in all of the other sets; and iteratively repeat the selection, search and addition with respect to at least one subsequent filter-identifier until a last filter-identifier in any set is reached.

13. The article of claim 12 further comprising machine-executable instructions for causing the machine to: place the filter-identifiers in a hierarchical order; and search from a filter-identifier with a highest value towards a filter-identifier with a lowest value in the hierarchy.

14. The article of claim 13 wherein the machine-executable instructions to select a particular filter-identifier further comprise instructions to cause the machine to: select an initial filter-identifier from each filter element set, said initial filter-identifier having a highest value among the filter-identifiers in that filter element set; and select one of the initial filter-identifiers as the particular filter-identifier, said one of the initial filter-identifiers having a lowest value among the initial filter-identifiers.

15. The article of claim 14 further comprising the machine-executable instructions for causing the machine to: select a filter-identifier from each filter element set, said filter-identifier having a highest value among the filter-identifiers in that filter element set that is lower in value than the search-identifier value; and select one of the filter-identifiers as the iterative particular filter-identifier, said one of the iterative filter-identifiers having a lowest value among the iterative filter-identifiers.

16. An article of manufacture comprising a non-transitory machine-readable medium storing machine-executable instructions that when applied to a machine cause the machine to:
generate node values in a tree for each endpoint value associated with at least one policy-identifier;
associate a first set of policy-identifiers with a particular one of the node values, wherein the first set of policy-identifiers is applied to data-packets having packet-header classifier fields matching the particular one of the node values; and
associate a second set of policy-identifiers with the particular one of the node values, wherein the second set of policy-identifiers is applied to data-packets having packet-header classifier fields with a value between the particular one of the node values and a next higher node value.

17. The article of claim 16 further comprising instructions to produce the second set of policy-identifiers from an intersection set of the first set of policy-identifiers and a first set of policy-identifiers associated with the next higher node value.

18. An apparatus comprising:
a network interface adapter;
a first circuitry communicatively coupled to the network interface adapter to generate a filter-identifier based, at least in part, on one or more filter elements associated with a data packet header field, wherein the filter-identifier is different from a policy-identifier that identifies a policy applicable to data packets having specified entries in the one or more filter elements;
a second circuitry communicatively coupled to the network interface adapter to:
characterizing the specified entries in the filter elements as either a range-based value or an exact value;
generating a bit mask from the characterizing, each bit in the bit mask corresponding to a filter element;
setting a bit in the bit mask to be a first logical value when its corresponding filter element has a range-based value;
setting a bit in the bit mask to be a second, different logical value when its corresponding filter element has an exact value;
a third circuitry communicatively coupled to the network interface adapter to determine respective sets of one or more filter-identifiers associated with respective filter elements; and
a fourth circuitry communicatively coupled to the network interface adapter to produce a result-set of filter-identifiers that is based on an intersection of the filter-identifier sets.

19. The apparatus of claim 18 further comprising a fifth circuitry communicatively couple to the network interface adapter to associate each filter-identifier with a policy-identifier.

20. The apparatus of claim 19 further comprising a sixth circuitry communicatively coupled to the network interface adapter to: select a particular filter-identifier from one of the filter element sets as a search-identifier; search the other filter element sets for a match of the search-identifier; add the search-identifier to a result set if the search-identifier is found in all of the other sets; and iteratively repeat the selection, search and addition with respect to at least one subsequent filter-identifier until a last filter-identifier in any set is reached.

21. The apparatus of claim 20 further comprising a seventh circuitry communicatively coupled to the network interface adapter to: place the filter-identifiers in a hierarchical order; and search from a filter-identifier with a highest value towards a filter-identifier with a lowest value in the hierarchy.

22. The apparatus of claim 21 further comprising an eighth circuitry communicatively coupled to the network interface adapter to: select an initial filter-identifier from each filter element set, said initial filter-identifier having a highest value among the filter-identifiers in that filter element set; and select one of the initial filter-identifiers as the particular filter-identifier, said one of the initial filter-identifiers having a lowest value among the initial filter-identifiers.

23. The apparatus of claim 22 further comprising a ninth circuitry communicatively coupled to the network interface adapter to: select a filter-identifier from each filter element set, said filter-identifier having a highest value among the filter-identifiers in that filter element set that is lower in value than the search-identifier value; and select one of the filter-identifiers as the iterative particular filter-identifier, said one of the iterative filter-identifiers having a lowest value among the iterative filter-identifiers.

24. A system comprising: a network; and a network device communicatively coupled to the network, the device including a processor and instructions executable by the processor to cause the processor to:
generate a filter-identifier based, at least in part, on one or more filter elements associated with a data packet header field, wherein the filter-identifier is different from a policy-identifier that identifies a policy applicable to data packets having specified entries in the one or more filter elements;
characterize the specified entries in the filter elements as either a range-based value or an exact value;
generate a bit mask from the characterizing, each bit in the bit mask corresponding to a filter element;
set a bit in the bit mask to be a first logical value when its corresponding filter element has a range-based value;
set a bit in the bit mask to be a second, different logical value when its corresponding filter element has an exact value;
determine respective sets of one or more filter-identifiers associated with respective filter elements; and
produce a result-set of filter-identifiers that is based on an intersection of the filter-identifier sets.

25. The system of claim 24 further comprising instructions to cause the processor to associate each filter-identifier with a policy-identifier.

26. The system of claim 25 further comprising instructions to cause the processor to: select a particular filter-identifier from one of the filter element sets as a search-identifier; search the other filter element sets for a match of the search-identifier; add the search-identifier to a result set if the search-identifier is found in all of the other sets; and iteratively repeat the selection, search and addition with respect to at least one subsequent filter-identifier until a last filter-identifier in any set is reached.

* * * * *